US010537201B2

(12) United States Patent
Ozanne et al.

(10) Patent No.: US 10,537,201 B2
(45) Date of Patent: Jan. 21, 2020

(54) BEVERAGE PRODUCTION SYSTEM USING CAPSULES

(71) Applicant: NESTEC S.A., Vevey (CH)

(72) Inventors: Matthieu Ozanne, Publier (FR); Olivier Martin, Orbe (CH); Didier Vuagniaux, Gimel (CH)

(73) Assignee: Societe des Produits Nestle S.A., Vevey (CH)

( * ) Notice: Subject to any disclaimer, the term of this patent is extended or adjusted under 35 U.S.C. 154(b) by 260 days.

(21) Appl. No.: 15/573,638

(22) PCT Filed: Jun. 13, 2016

(86) PCT No.: PCT/EP2016/063485
§ 371 (c)(1),
(2) Date: Nov. 13, 2017

(87) PCT Pub. No.: WO2016/202735
PCT Pub. Date: Dec. 22, 2016

(65) Prior Publication Data
US 2018/0116442 A1 May 3, 2018

(30) Foreign Application Priority Data
Jun. 16, 2015 (EP) .................................... 15172425

(51) Int. Cl.
*A47J 31/36* (2006.01)
(52) U.S. Cl.
CPC ................... *A47J 31/3638* (2013.01)

(58) Field of Classification Search
CPC .. A47J 31/407; A47J 31/3695; A47J 31/3633; A47J 31/0668; A47J 31/3676; A47J 31/4403; A47J 31/4407; A47J 31/3623
See application file for complete search history.

(56) References Cited

FOREIGN PATENT DOCUMENTS

| WO | 2011144479 | 11/2011 |
| WO | 2016016741 | 1/2014 |
| WO | 2015048914 | 4/2015 |
| WO | 2015082664 | 6/2015 |

*Primary Examiner* — Hong T Yoo
(74) *Attorney, Agent, or Firm* — K&L Gates LLP

(57) ABSTRACT

The invention concerns beverage production system comprising a capsule (10) and a module (1) for producing a beverage from the capsule, the capsule (10) comprising an enclosure (10a) and a rim (10b), and the module (2) comprising a first capsule engagement member (3), which can be displaced relative to a second, co-operating capsule engagement member (2d) between a capsule discharge position and a beverage production position, and the displaceable first capsule engagement member (3) comprises holding means configured for holding the capsule within, the module comprising at least two means (7, 7a, 7b) for engaging the rim of the capsule extending beyond the first capsule engagement member when the first capsule engagement member (3) is displaced from the beverage production position to its capsule discharge position, and wherein the holding means are discrete hooks (341, 342) configured to engage with the rim (10b) of the capsule, and the retaining means are configured so that, during the displacement of the first capsule engagement member (3) from the beverage production position to its capsule discharge position, one (7b) of the two engaging means engages the rim of the capsule before the other engaging mean (7a).

13 Claims, 11 Drawing Sheets

BEVERAGE PRODUCTION SYSTEM USING CAPSULES

CROSS REFERENCE TO RELATED APPLICATIONS

The present application is a National Stage of International Application No. PCT/EP2016/063485, filed on Jun. 13, 2016, which claims priority to European Patent Application No. 15172425.9, filed on Jun. 16, 2015, the entire contents of which are being incorporated herein by reference.

FIELD OF THE INVENTION

The present invention relates to the field of producing beverages or other liquid comestibles on the basis of ingredients which are contained in a capsule.

BACKGROUND OF THE INVENTION

In beverage production systems using capsules, the capsule is usually inserted into the beverage production module of the machine. The module is designed to inject a liquid, such as for example hot water, into the capsule in order to have the liquid interacts with the ingredients contained in the capsule. Note that some beverage production techniques ask for a pressurized injection like coffee beverage, others such as e.g. brewing tea can be made at ambient pressure. The invention can find application in both scenarios. The result of the interaction, i.e. the produced beverage or liquid comestible, is then drained from the capsule and fed to a receptacle such as e.g. a cup placed below an outlet for the beverage.

The invention relates particularly to beverage production machines comprising a module with a first capsule engagement member, which can be displaced relative to a second co-operating capsule engagement member between an opened capsule insertion position and a closed capsule-enclosure position. The module comprises means for actively retracting the capsule from the beverage production position to a capsule discharge position in which the capsule is discharged from the module. Such a machine presents the advantage of having a capsule discharge position which is offset relative to the beverage production position. This advantage is of interest when the machine and the capsule are conceived for delivering the beverage directly out of the capsule in a cup without the beverage contacting the machine since it enables the discharge of the capsule in a position which is offset relative to the vertical of the beverage flow path. Such a beverage production machine is described in EP-A1-2033551, WO 2011/144479 or WO 2015/032651.

In such a machine, the capsule is introduced in the beverage production module, is retained by pre-fixation arms in a pre-engagement position and is then engaged by a first engagement member that is conformal to the capsule shape further to the movement of the first engagement member to the capsule. At the end of this movement, the capsule is clamped between the first and the second engagement members and the diluent, generally water, can be introduced to interact with the ingredients in the capsule. The resulting beverage flows out of the capsule either through en outlet provided in the capsule or/and produced by the machine during the capsule engagement and falls by gravity in a cup. Once the beverage has been delivered, the first engagement member moves back to the capsule discharge position dragging the capsule towards a position offset relative to the vertical of the beverage flow path. The movement of the first engagement member is a combination of a linear movement and an end swivelling movement so that the capsule can fall by gravity from the first engagement member.

The module comprises means for retaining the rim of the capsule extending beyond the first capsule engagement member when the first capsule engagement member is displaced from the beverage production position to its capsule discharge position. These means consist in two tabs symmetrically positioned on the lateral walls of the frame of the module and able to retain the rim of the capsule.

The first engagement member, that is conformal to the capsule shape, comprises holding means configured for holding the capsule therein during the transport of the capsule by the first engagement member back to the capsule discharge position towards a position offset relative to the vertical of the beverage flow path. These holding means are friction means that exerts a friction on the capsule enclosure outer wall when it is engaged in the first capsule engagement member. According to WO 2011/144479 or WO 2015/032651, these holding means are discrete bumps placed on the internal surface of the hollow bell member of the first capsule engagement member and made of a flexible and resilient material like an elastomeric material. Indeed the friction on the capsule must not be too important so that the tabs can easily retain the capsule through its rim during the capsule displacement; for that aim the nature of an elastomeric material is perfectly adapted. Yet such bumps of flexible and resilient material represent a certain cost in terms of machine manufacturing in view of their nature and the necessity to assemble them on the internal surface of the first engagement member that is usually made of hard plastic. It means that changing the nature of these bumps or removing these bumps would directly impact the efficient discharge of the capsule from the first capsule engagement member.

The invention now targets at an improvement of the beverage production machines described in WO 2011/144479 or WO 2015/032651 in order to reduce the cost of production of machines while providing reliable discharge of the capsule from such beverage machines.

SUMMARY OF THE INVENTION

In a first aspect of the invention, there is provided a beverage production system comprising a capsule and a module for producing a beverage from the capsule,
  the capsule comprising an enclosure and a rim, and
  the module comprising
    a first capsule engagement member, which can be displaced relative to a second, co-operating capsule engagement member between a capsule discharge position and a beverage production position,
    means for actively retracting the first capsule engagement member from the beverage production position to the capsule discharge position in which the capsule is discharged from the first capsule engagement member,
  the displaceable first capsule engagement member comprising a capsule receptacle, and
    the capsule presenting
    an enclosure outer shape that is conformal to at least a portion of the capsule receptacle, and
    a rim size such that at least a part of the rim of the capsule extends beyond at least a part of the first capsule engagement member once it is engaged in the first capsule engagement member, and the displaceable first capsule engagement member comprising holding means configured for holding the capsule within the capsule receptacle, the module comprising at least two means for retaining the rim of the capsule extending beyond the first capsule engagement member when said first capsule engagement member is displaced from the beverage production position to its capsule discharge position, wherein said holding means are discrete hooks configured to engage with the rim of the capsule, and wherein said two means for retaining the rim of the capsule are configured so that, during the displacement of the first capsule engagement member from the beverage production position to its capsule discharge position, one of the two retaining means engages the rim of the capsule before the other retaining means.

The module for producing a beverage of the system can present the features of the module described in EP-A1-2033551. It comprises two co-operating capsule engagement members, the first member being displaceable between a closed position in which the capsule is engaged between the two members and called the beverage production position and an open position in which no capsule is engaged by the members and called the capsule discharge position.

When the first member is in the beverage production position, a beverage can be extracted from the capsule and dispensed in a drinking container.

The capsule discharge position is distinct from the beverage production position. Accordingly the capsule discharge position is offset relative to the beverage production position that is to the vertical of the beverage flow path.

The displaceable first capsule engagement member comprises a capsule receptacle, such as a cup-shaped capsule receptacle or hollow-bell shaped receptacle. This receptacle presents a sidewall and a mouth that delimit with the second capsule engagement member at least part of a brewing chamber for containing the capsule.

The module comprises means for displacing the first capsule engagement member between the two positions.

Generally the module is designed for injecting water into the capsule and having beverage drained from the capsule while the capsule is in the beverage production position.

Preferably the second engagement member is a front wall against which the first member can push the capsule. Once pushed against the front wall, an outlet can be opened in the capsule so that beverage can flow from said outlet and flows along the front wall in a drinking container.

Accordingly the module, preferably the second capsule engagement member, can comprise an opening means for piercing the capsule and producing a beverage outlet in the capsule. The opening means can be a puncher as described in WO 2010/146101. This opening means is generally placed adjacent to the second capsule engagement member or can even be part of this second capsule engagement member.

According to another embodiment the capsule can present an opened beverage outlet before being introduced in the module.

In the preferred embodiment, the second engagement member is essentially positioned to the vertical of the beverage flow path.

The capsule of the system of the present invention comprises an enclosure in which beverage ingredients are contained. These ingredients can be for example selected in the following list tea leaves, herbal or fruit tea leaves, roast and ground coffee, soluble beverage ingredients, . . . . The enclosure is usually a cup-shaped frame which can encompass different cross sections such as triangular, circular, ellipsoid, egg-shaped, square, rectangular or polygonal section. According to one preferred embodiment the enclosure presents a hollow bell shape.

The enclosure is usually closed by a cover, preferably a plane cover.

The capsule of the present invention also presents a rim at the edge of the enclosure. The cover can be fixed on this rim.

The displaceable first capsule engagement member comprises a capsule receptacle and the capsule presents an enclosure outer shape that is conformal to at least a portion of said capsule receptacle. By "conformal", it is meant that the capsule outer shape is defined in order to match at least a portion of the capsule receptacle inner shape. Thus at least a part of the outer contour of the capsule can be housed in the capsule receptacle.

Besides, the capsule presents a rim size such that at least a part of the rim of the capsule extends beyond the first capsule engagement member once it is engaged in the capsule receptacle.

The displaceable first capsule engagement member comprises holding means configured for holding the capsule within the capsule receptacle. These holding means aim to holding the capsule inside the capsule receptacle when the first capsule engagement member is actively retracted from the beverage production position to the capsule discharge position. These holding means guarantee that the capsule does not remain stick to the second engagement member while the first engagement member is retracted. These holding means are discrete hooks configured to engage with the rim of the capsule.

Preferably the displaceable first capsule engagement member comprises two hooks configured to engage with the rim of the capsule, said hooks being positioned on the lateral sides of the front face of the capsule receptacle. Preferably these two hooks are positioned on the lateral sides of the front face of the capsule receptacle.

The hooks and the first capsule engagement member can be made of the same plastic material so that the hooks can be moulded as one single piece with that first capsule engagement member. Accordingly the costs of manufacturing can be reduced.

According to one preferred embodiment, each hook is an arm extending from a lateral side of the front face of the capsule receptacle, said arm presenting a slanted end and comprising a vertical slit. The slanted end enables each hook to engage progressively with the rim of the capsule when the first capsule engagement member moves to the capsule to surround it and press it against the second engagement member. The rim of the capsule slides along the slanted end and is led to the vertical slit configured to hold said rim.

The module comprises also at least two means for retaining the rim of the capsule that extends beyond the first capsule engagement member when the first capsule engagement member is displaced from the beverage production position to its capsule discharge position.

These two means are configured so that, during the displacement of the first capsule engagement member from the beverage production position to its capsule discharge position, one of the two retaining means engages the rim of the capsule before the other retaining mean engages the capsule rim.

Accordingly the capsule is disengaged from the first capsule engagement member in two short close steps:

first, one lateral rim of the capsule is engaged by the first retaining means. This first retaining means hold the rim of the capsule and removes the rim of the capsule from the first hook of the member having the shape of a hollow bell.

secondly, the other lateral rim of the capsule is engaged by the second retaining means. This second retaining means hold the rim of the capsule and removes the rim of the capsule from the second hook of the member having the shape of a hollow bell.

Consequently the removal of the rim of the capsule from the two hooks is split in two steps. As the forces necessary for removing the rim successively from each hook are inferior to the force necessary for removing the rim simultaneously from both hooks, the capsule can be removed from the member having the shape of a hollow bell with less force. Consequently there is no risk that the capsule is thrown out of the first capsule engagement member horizontally in direction of the front of the module and remains blocked in the machine in place of simply dragging down in the capsule bin, preventing the introduction of any new capsule within the module.

Then the capsule is retained through its rim by both retaining means while the first engagement member finishes the course of its movement. At the end of this movement the first engagement member fully releases the capsule from the capsule receptacle and the capsule is free to fall downwards, preferably in a capsule collecting bin.

Preferably one retaining means is positioned on each lateral side of the longitudinal axis of displacement of the first capsule engagement member and the positions of the two retaining means along said longitudinal axis of displacement are offset one relative to the other.

Generally the positions of the two retaining means along the longitudinal axis of the frame of the module are offset one relative to the other by at least 1 mm, preferably, at most 5 mm, even more preferably between 3 and 4 mm.

According to one preferred embodiment the module comprises lateral walls on each lateral side of the path of the first capsule engagement member and the retaining means are tabs protruding from said lateral walls.

A tab is present on each lateral wall so that each tab can engage a lateral side of the capsule opposed to the lateral side of the capsule engaged by the other tab. Accordingly different parts of the capsule rim are engaged.

The tabs protrude by such a height within the path of the first capsule engagement member, that they engage the rim of the capsule during the movement of said capsule with the first engagement member.

The tabs can be made integral with the lateral walls of the frame of the module, for example, if the frame of the module is in plastic, they can be moulded together.

Preferably tabs are positioned in the lateral walls of the module so as to engage a part of the rim of the capsule, said part being close to the portion of the rim engaged with one of the hooks.

Preferably in the module of the system of the present invention the means for actively retracting the first capsule engagement member from the beverage production position to the capsule discharge position are designed to implement the combination of a linear movement and a swivelling end movement.

Usually the first capsule engagement member comprises opening means for piercing the capsule and injecting water in the capsule. The opening means can be a hollow needle linked to water supply.

Preferably the module of the system of the present invention comprises pre-fixation means which are provided at a lateral side of the capsule and designed to engage with the rim of the capsule for fixation of the capsule close to the second engagement member before the beverage production.

In a second aspect of the invention, there is provided the use of a capsule comprising an enclosure and a rim in a beverage production system as defined above, wherein:
the hooks engage with the rim of the capsule, when the first capsule engagement member is displaced to the second, co-operating capsule engagement member, and
the two retaining means of the module retain the rim of the capsule successively one after the other during the displacement of the first capsule engagement member from the beverage production position to its capsule discharge position.

In the present application the terms "internal", "external", "rear", "front", "bottom" and "lateral" are used to describe the relational positioning of features of the invention. These terms should be understood to refer to the module in its normal orientation for the production of a beverage as shown in FIGS. 1 to 3.

The above aspects of the invention may be combined in any suitable combination. Moreover, various features herein may be combined with one or more of the above aspects to provide combinations other than those specifically illustrated and described. Further objects and advantageous features of the invention will be apparent from the claims, from the detailed description, and annexed drawings.

BRIEF DESCRIPTION OF THE DRAWINGS

The characteristics and advantages of the invention will be better understood in relation to the following figures, wherein.

DETAILED DESCRIPTION OF THE DRAWINGS

Figure 1:
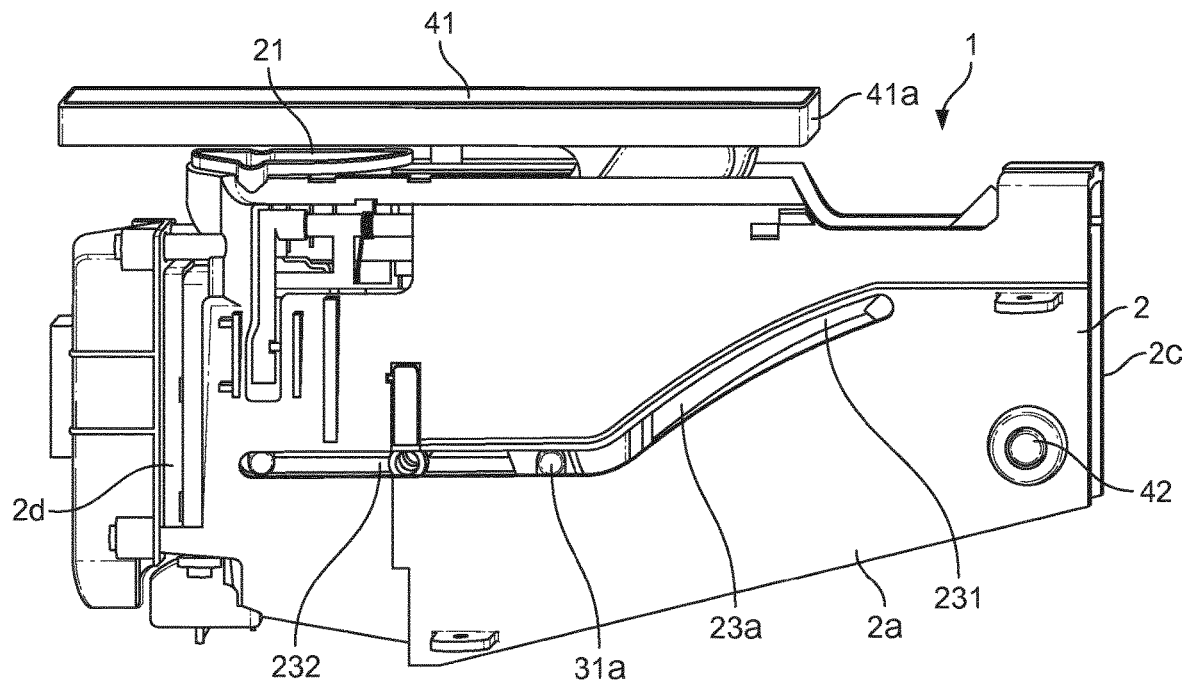
FIG. 1 is a side view of a module for introducing a capsule, positioning the capsule for the beverage preparation and ejecting the capsule in a beverage preparation apparatus according to the present invention, FIG. 2 corresponds to FIG. 1 except that the module frame is transparent.
Figure 3:
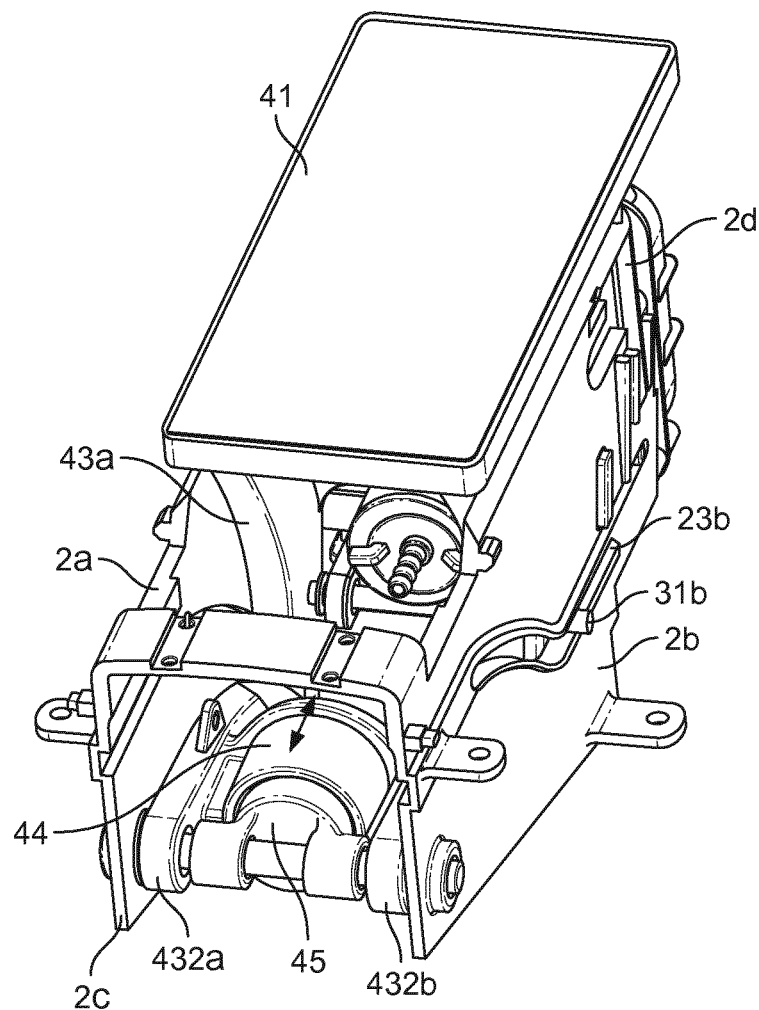
FIG. 3 is a top view of the rear side of the module of FIG. 1.

FIG. 1 illustrates a module 1 of a beverage preparation apparatus according to the present invention. The module enables the introduction and the positioning of a capsule for the preparation of a beverage and the ejection of the capsule. The module is illustrated in the position for the preparation of a beverage. The module comprises a frame 2. FIG. 1 shows the lateral wall 2a and the rear and front ends 2c, 2d of the frame. At its top it presents an upper opening 21 designed for introducing a capsule in the machine near the frame front end 2d. The upper opening 21 is closed by a handle 41. The lateral wall 2a comprises a guiding curve 23a in which a guiding pin 31a can slide. The other frame lateral wall 2b comprises the same curve (see FIG. 3).

Figure 2:
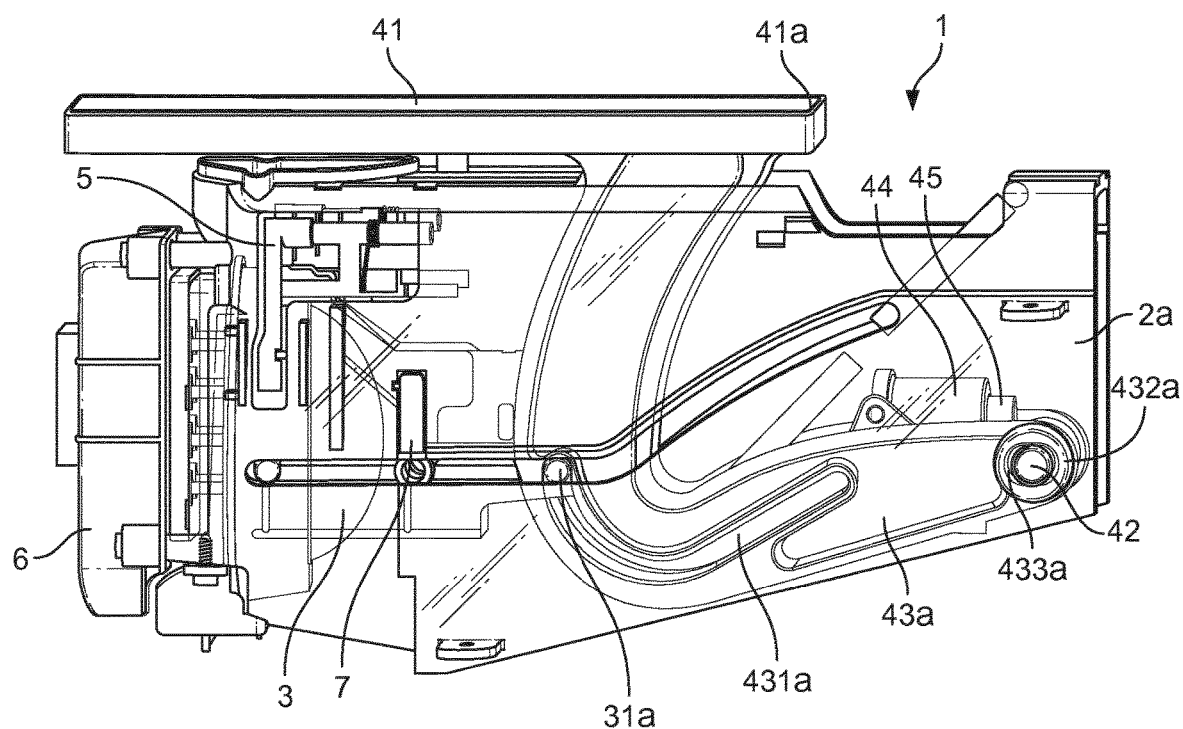

In FIG. 2 the frame 2 has been made transparent so that the internal parts of the module are made apparent. The module 1 comprises a first capsule engagement member 3 in the position for the preparation of a beverage near the frame front end 2d, said frame front end 2d acting as the second engagement member. At the front end the module comprises an identification member 6 for identifying the capsule engaged in the capsule engagement member 3.

The capsule engagement member 3 comprises two lateral guiding pins 31a, 31b each of the lateral guiding pins cooperating with one of the guiding curves 23a, 23b of the frame lateral walls 2a, 2b. These guiding curves are composed of two different segments an essentially horizontal linear segment 232 near the front end 2d of the frame and an inclined linear segment 231 rising near the rear end 2c of the frame. By following these guiding curves 23a, 23b the lateral pins 31a, 31b of the capsule engagement member move said member according to the combination of a linear displacement near the front end 2d of the frame and an inclined displacement near the rear end 2c of the frame. This change of direction during the displacement of the capsule engagement member from the front end 2d to the rear end 2c creates a swivelling movement to disengage and eject the capsule. The ejection is also due to the presence of a tab 7 that slightly rises in the frame in order to engage the rim of the capsule when the capsule engagement member with the capsule engaged inside moves from the second position to the first position.

The module comprises an actuator that an operator actuates manually to prepare a beverage. The actuator comprises the handle 41 that can close the upper opening 21 and a fixed axis 42 perpendicularly attached between the frame lateral walls 2a, 2b at the frame rear end. The actuator is able to rotate around said fixed axis. The actuator comprises two lateral walls 43a, 43b joining the rear end 41a of the actuator handle to the fixed axis 42 and each of said lateral walls comprises a guiding curve 431a, 431b cooperating with the lateral guiding pins 31a, 31b of the capsule engagement member.

Consequently the only movement of the actuator is a rotation of said actuator around the fixed axis 42 and this movement of the actuator 4 induces a movement of the capsule engagement member 3 due to the movement of the guiding pins 3a, 3b in the guiding curves 431a, 431b of the actuator.

The movement of the actuator 4 is induced by the handle 41. Then when an operator wants to prepare a beverage:
he/she pulls up the handle 41 in order to remove it from the upper opening 21 of the frame. During this movement the handle 41 rotates clockwise around the fixed axis 42 in FIGS. 1 and 2. The lateral pins 31a, 31b are then pulled at the rear end 2c of the frame and the capsule engagement member 3 also which makes the space in the frame 3 under the upper opening 21 free for the introduction of the capsule. The operator can introduce a capsule through the opening 21 The capsule is retained in front of the front end 2d by pre-fixation members 5, then the operator begins to push the handle 41 in order to close the upper opening 21 as illustrated in FIGS. 1 and 2. This movement of the handle induces the rotation of the actuator 4 around the fixed axis 42 anticlockwise in FIGS. 1 and 2. The lateral pins 31a, 31b are then pulled in direction of the front end 2d of the frame and the capsule engagement member 3 also. During the movement the capsule engagement member 3 engages the capsule and frees it from the pre-fixation members 5. The movement goes on until the capsule reaches the front end 2d of the frame and comes into contact with the identifying member 6 as illustrated in FIG. 2. In this position a beverage can be prepared by introduction of fluid, usually hot water, in the capsule engagement member through a needle connected to a fluid supply.

Figure 4A:
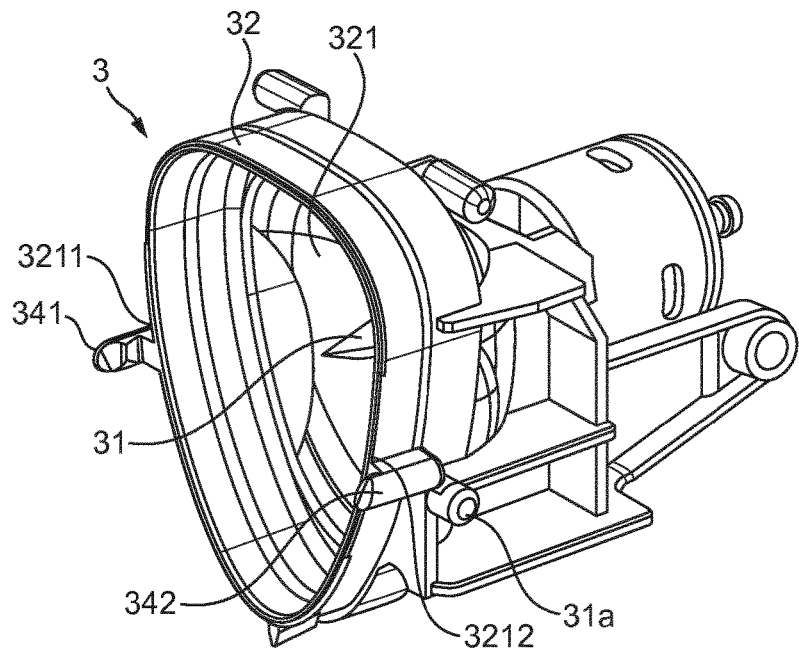
FIG. 4a illustrates a first capsule engagement member.

FIG. 4a illustrates the displaceable first capsule engagement member 3. This member comprises a capsule receptacle 32. The shape of the capsule receptacle usually matches at least a part of the outer shape of the housing of the capsule. The illustrated receptacle presents the shape of a hollow bell yet other shapes could be designed (cup shape, . . . ).

Figure 5:
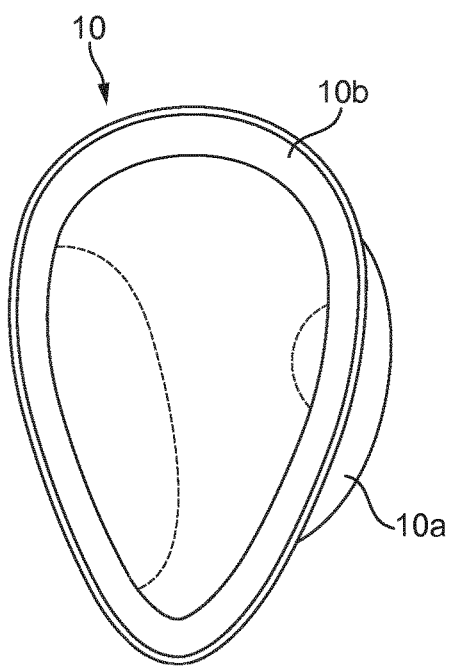

FIG. 5 illustrates the shape of the body of a capsule 10 used with the displaceable first capsule engagement member of FIG. 4a. The capsule comprises a cup-shaped enclosure 10a; the outer shape of this enclosure matches the shape of at least a portion of the capsule receptacle 32 of FIG. 4a.

The enclosure of the capsule is usually closed by a cover (not illustrated), preferably a plane cover. The capsule also presents a rim 10b at the edge of the enclosure. The cover can be fixed on this rim. The rim size is such that at least a part of the rim 10b of the capsule extends beyond the first capsule engagement member 3 once it is engaged in the first capsule engagement member.

The enclosure of the capsule is filled with beverage ingredients (not illustrated).

FIG. 4a shows that, at the rear end of the first capsule engagement member 3, a hollow needle 31 is fixed for piercing the capsule and injecting water. For example the needle described in EP 2 080 454 can be used. Other means for introducing water in the capsule could be used.

The first engagement member 3 also comprises retaining means 341, 342 on each lateral sides of the front part of the hollow member 32. Said retaining means are hooks.

Figure 4B:
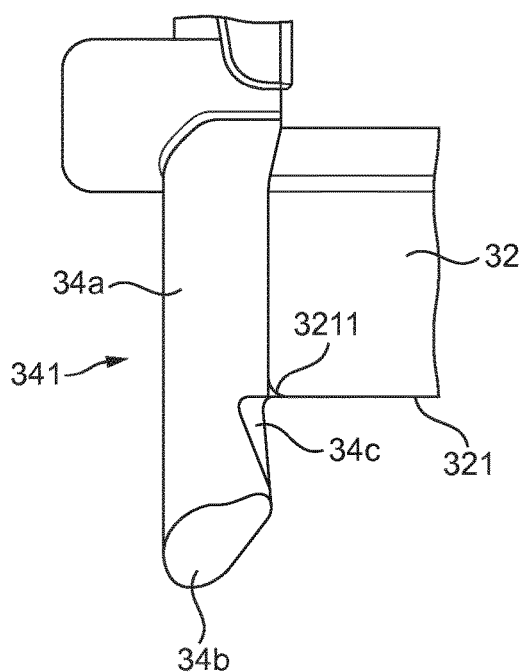
FIG. 4b is a magnified top view of one of the hook of the first engagement member of FIG. 4a, FIG. 5 illustrates a capsule able to be used with the first capsule engagement member of FIG. 4a, FIG. 6a illustrates a back view of the first capsule engagement member of FIG. 4 with the capsule 1 of FIG. 5 engaged inside

FIG. 4b is a magnified top view of one of the hooks 341 of FIG. 4a. The hook 341 comprises an arm 34a positioned on the lateral side of the capsule receptacle 32 and extending perpendicularly from the front side 321 of said capsule receptacle. The arm 34a presents a slanted free end 34b. The end is slanted in direction of centre of the capsule receptacle 32 so that, when the first engagement member moves towards the capsule, the slanted end 34b slides along the rim of the capsule and slightly compresses this rim to make it enter within the slit 34c of the arm in which it is retained. The same operation happens simultaneously with the other arm 342 on the other side of the rim of the capsule.

Figure 6A:
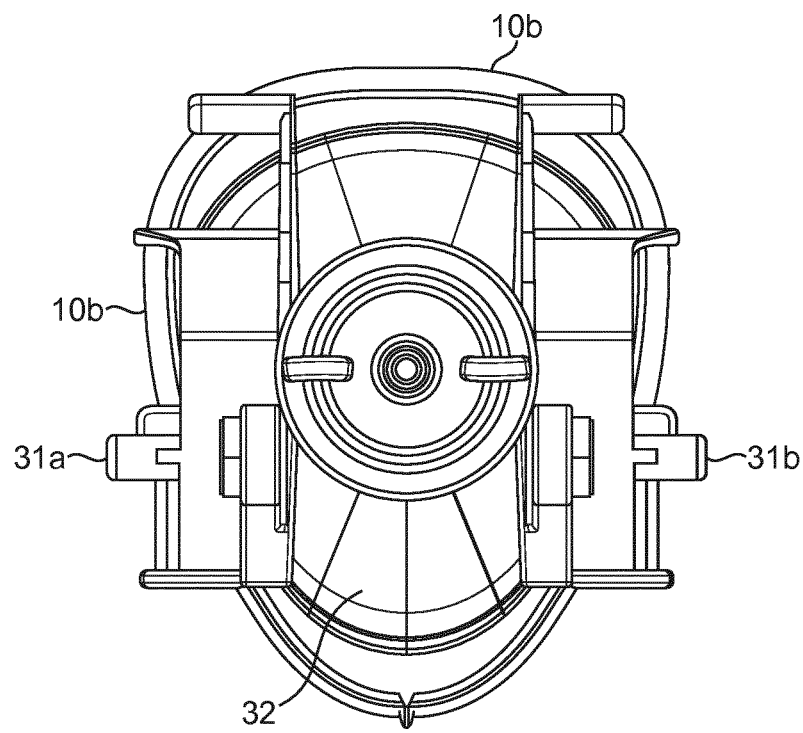
FIG. 6b is the corresponding front view.

FIG. 6a illustrates a back view of the first capsule engagement member 1 with the capsule 10 engaged in the capsule receptacle 32. Some parts of the rim 10b of the capsule extend beyond the limits of the first capsule engagement member. It is preferable that at least an essentially vertical part of the rim 10b extends beyond the limits of the first capsule engagement member. The term vertical is to be interpreted according to the position of the capsule inside the module according to its normal orientation for the production of a beverage.

The first capsule engagement member 3 also comprises guiding pins 31a, 31b, provided at the lateral sides of the capsule cage. In the present specification the term cage designates the capsule receptacle.

Figure 6B:
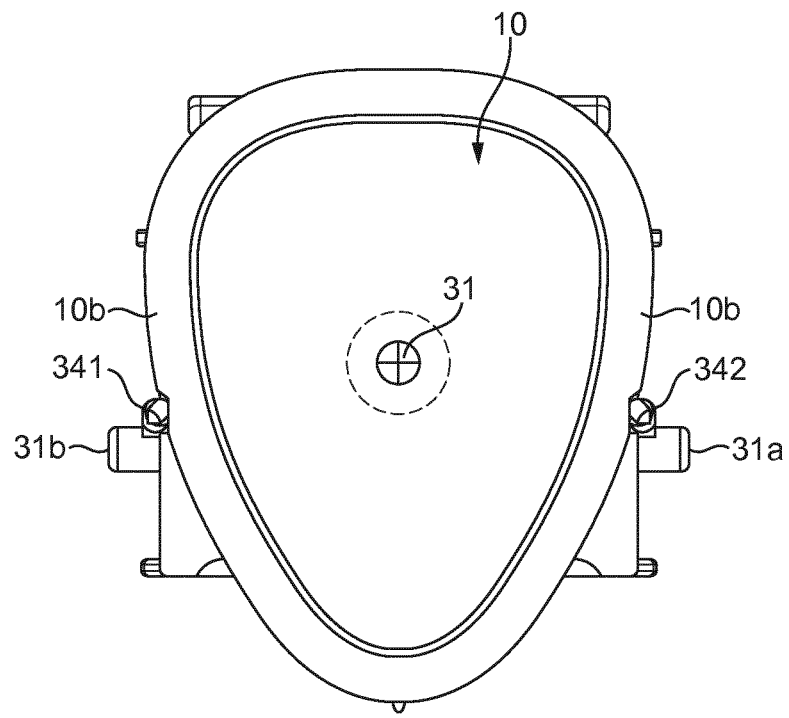

FIG. 6b illustrates a front view of the first capsule engagement member 32 and the capsule 10 engaged in the capsule receptacle, the rim 10b being hold by hooks 341, 342. The rim can be slightly deform when hold in the hooks.

FIGS. 7a to 7d illustrates the movement of the elements of the module from the closed position to the opened position, in particular the displacement of the different internal elements of the module when the handle 41 is moved from the position where it closes the frame upper opening 21 designed for introducing a capsule—that is a position for preparing a beverage—to the position where said opening is no more covered by the handle—that is a position where a used capsule can be ejected and a new capsule can be introduced in the module.

The combination of the translation movement and then swiveling movement is illustrated.

Figure 7A:
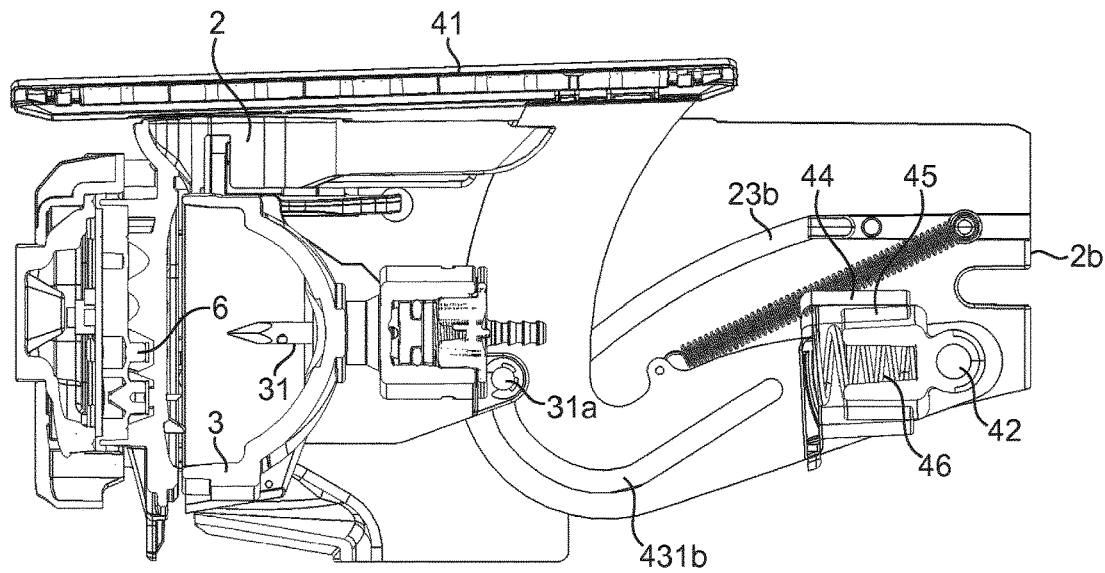
FIGS. 7a to 7d are vertical section views of the module during the opening movement of the handle.
Figure 7B:
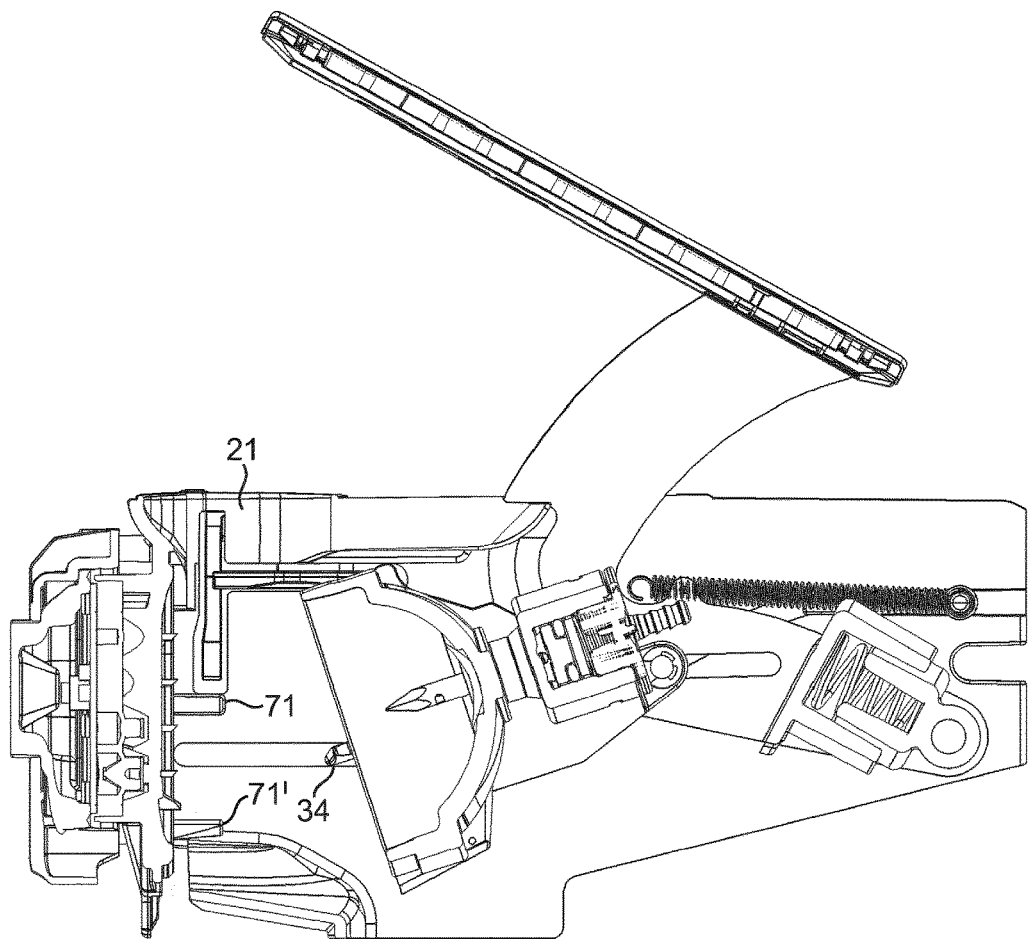
Figure 7C:
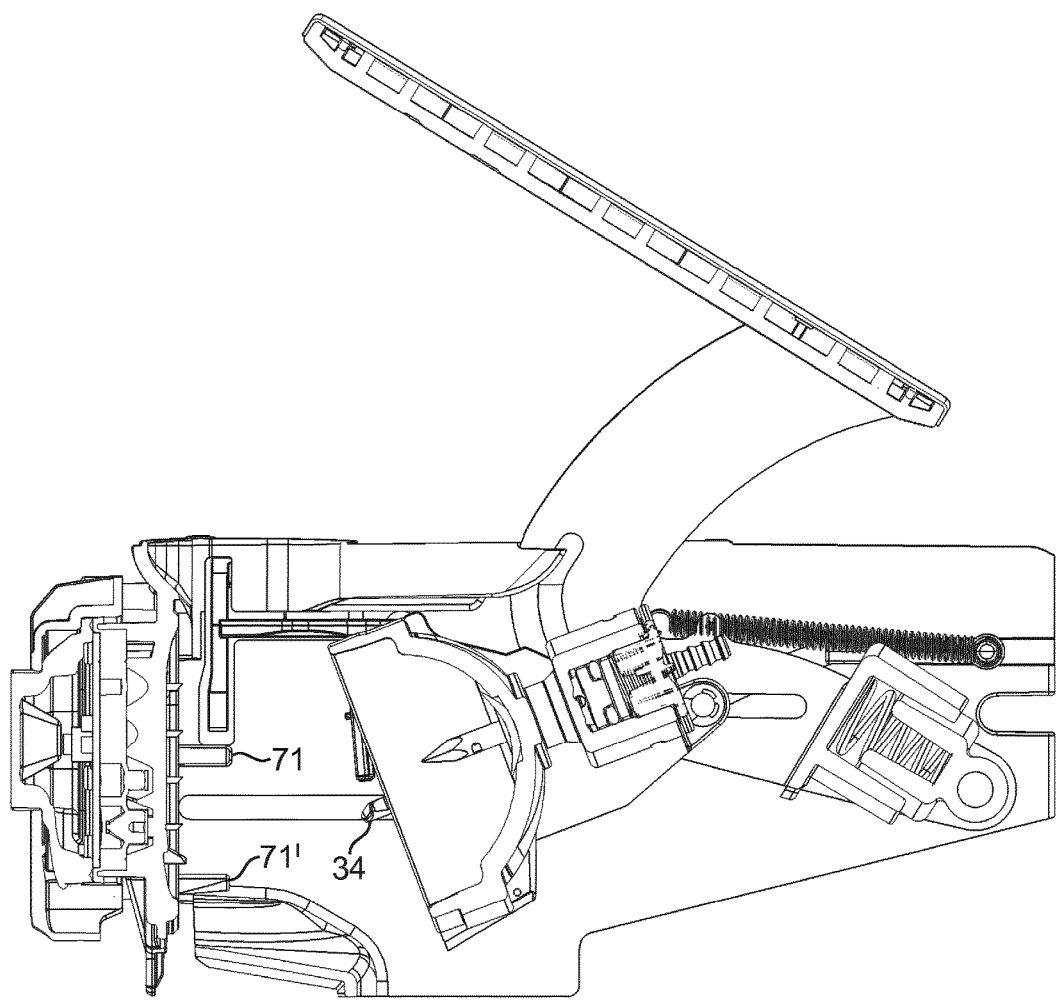
Figure 7D:
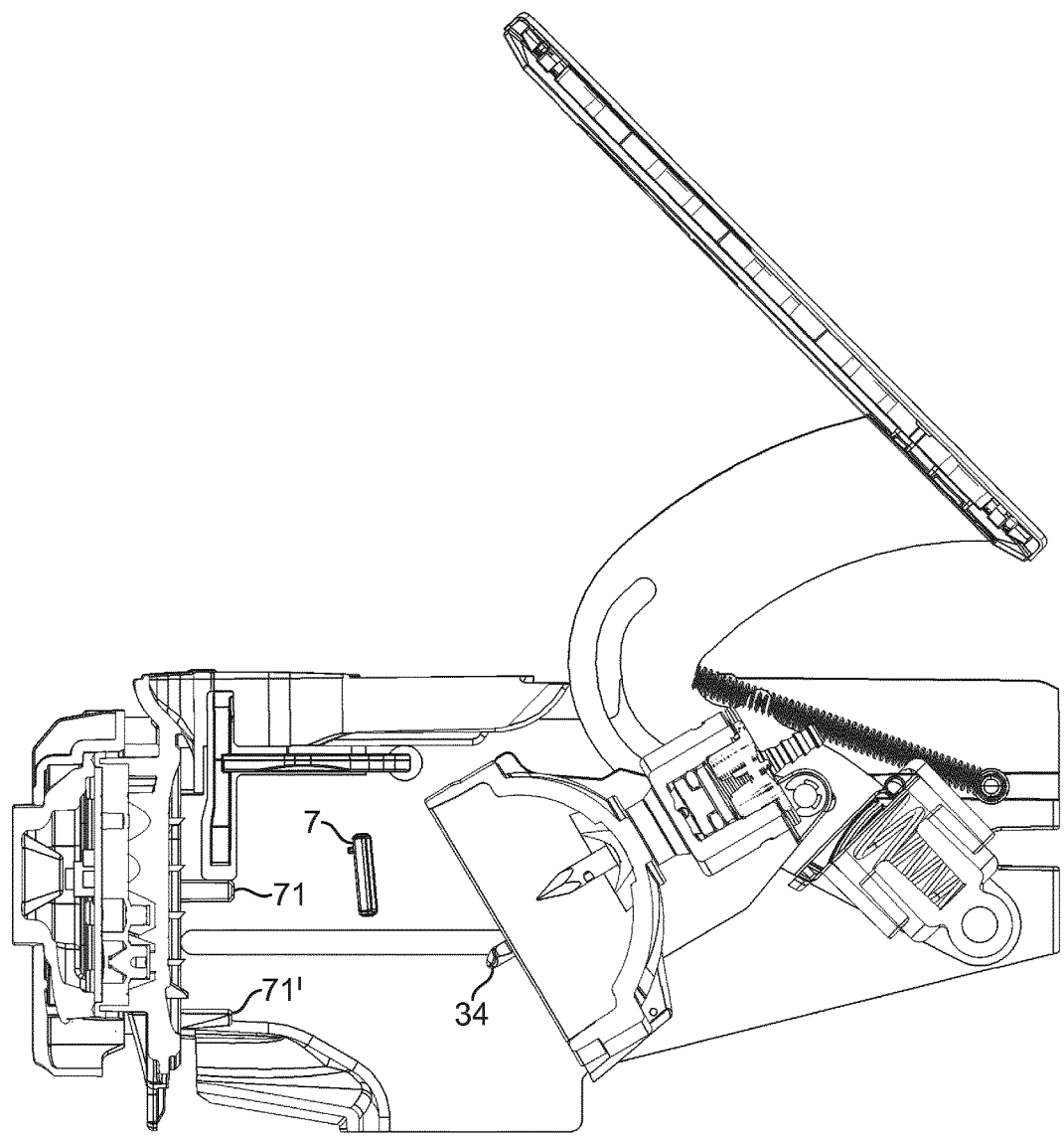

In FIGS. 7b to 7d, one of two tabs 7 for engaging the rim of the capsule and one of the two hooks 34 for holding the capsule rim are apparent. The hook 34, and respectively the tab 7, are positioned on the lateral side of the capsule engagement member 32, and respectively on the lateral wall 2b of the module, so that the tab 7 engages the capsule rim in an area close to the rim part hold by the hook 34.

FIGS. 8a to 8f are schematic views of the module 1 illustrating the movement of the capsule in the module from its introduction in the module to its ejection out of the module. The figures are top views of the module and make apparent the relative movements of the first and second capsule engagement members 3, 2d, the capsule 10, the tabs 7a, 7b, the pre-fixation members 5a, 5b and the hooks 341, 342.

Figure 8A:
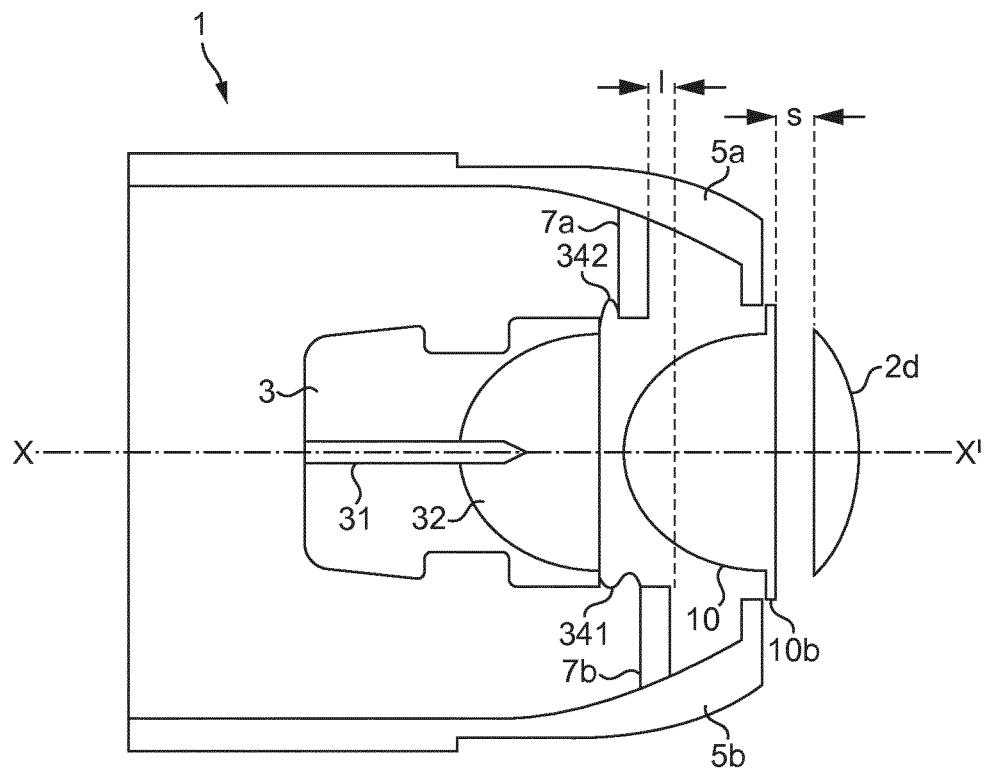
FIGS. 8a to 8f are schematic top views of the module illustrating the movement of a capsule in the module from its introduction to its ejection.

In FIG. 8a, capsule 10 has just been introduced in the module. The rim 10b of the capsule is positioned in space s demarcated between the front end 2d of the module and the end of the pre-fixation members 5a, 5b. These pre-fixation members 5a, 5b prevent the capsule from falling in direction of the back side of the module. A lower part of the capsule rim leans on support means (reference 71, 71' illustrated in FIGS. 7b to 7d) to avoid that the capsule falls downwards. Accordingly the capsule is retained by its rim in this position.

The first engagement member 3 is positioned away from the capsule and the front end 2d corresponding to the second engagement member. The first engagement member 3 is able to move along a longitudinal axis XX' to and away from the front end 2a of the module.

The figure illustrates the presence of two tabs 7a, 7b on the lateral sides of the module 1. Generally these tabs are fixed in the lateral walls of the frame of the module and are positioned so as to be able to contact the rim 10b of the capsule when it is moved to the ejection position. The positions of the tabs along the longitudinal axis XX' are offset one relative to the other by a distance I.

Figure 8B:
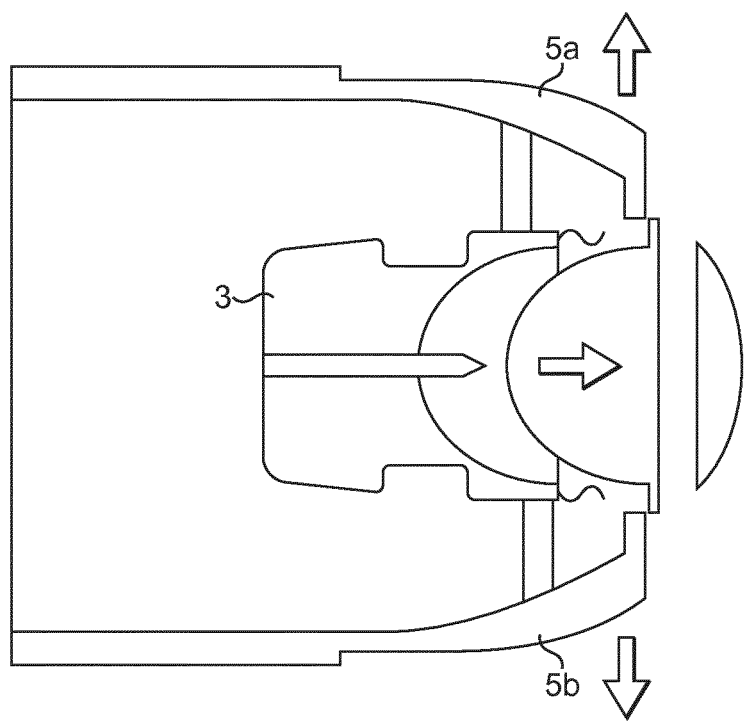

In FIG. 8b, the closure of the capsule cage begins. The first engagement member 3 is displaced in direction of the front end 2d. Simultaneously the pre-fixation members 5a, 5b begin to be moved away from the rim of the capsule as illustrated by arrows.

Figure 8C:
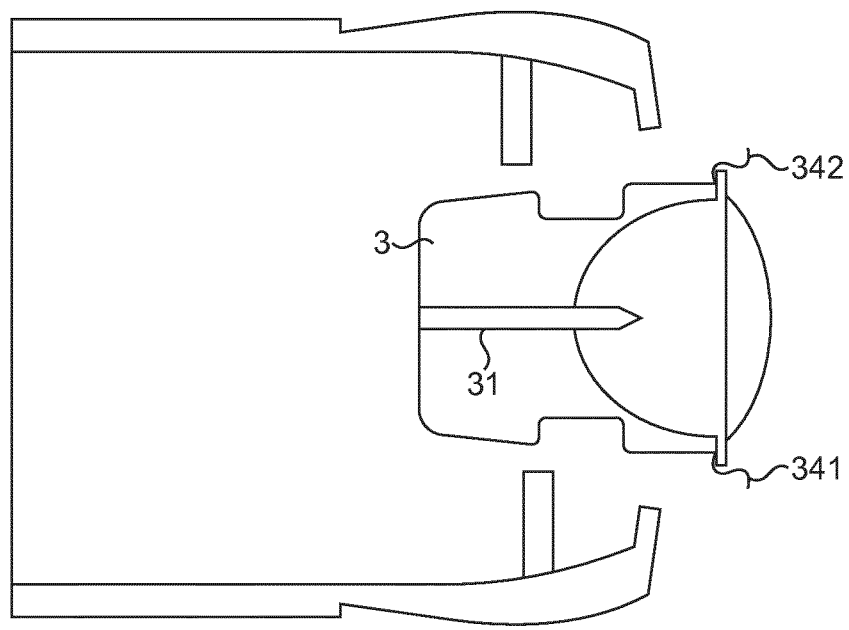

In FIG. 8c, the capsule cage has completed its movement in direction of the front end 2d. The pre-fixation members 5a, 5b have been completely moved away from the rim of the capsule and the capsule is maintained in the hollow member 32 of the first engagement member and against the front end 2d. The water needle 31 has pierced the capsule and the extraction can happen. The rim of the capsule is hold by the hooks 341, 342.

Figure 8D:
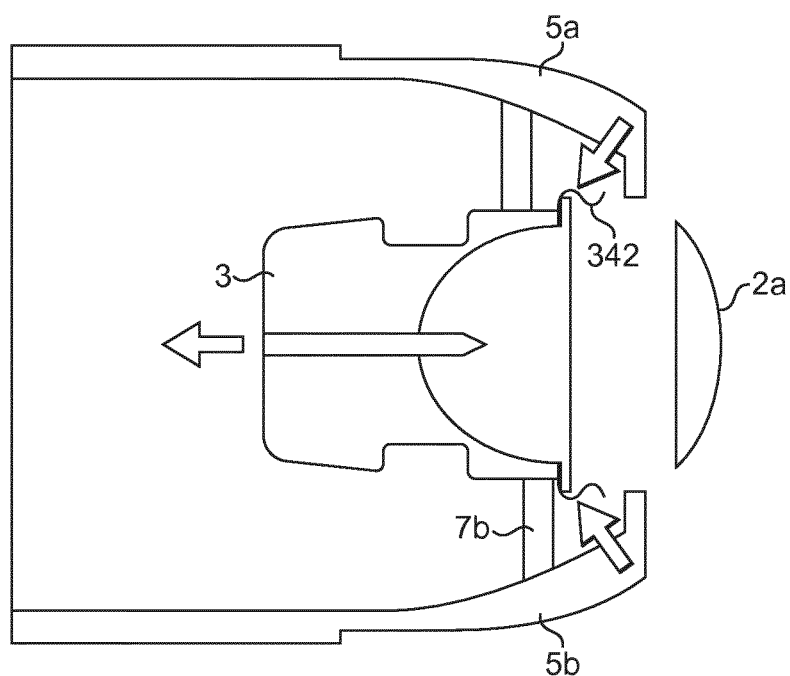

In FIG. 8d, the ejection movement begins. The first engagement member 3 moves back and away from the front end 2d and takes the capsule with. The pre-fixation members 5a, 5b are able to come back to their initial position as illustrated by arrows.

Figure 8E:
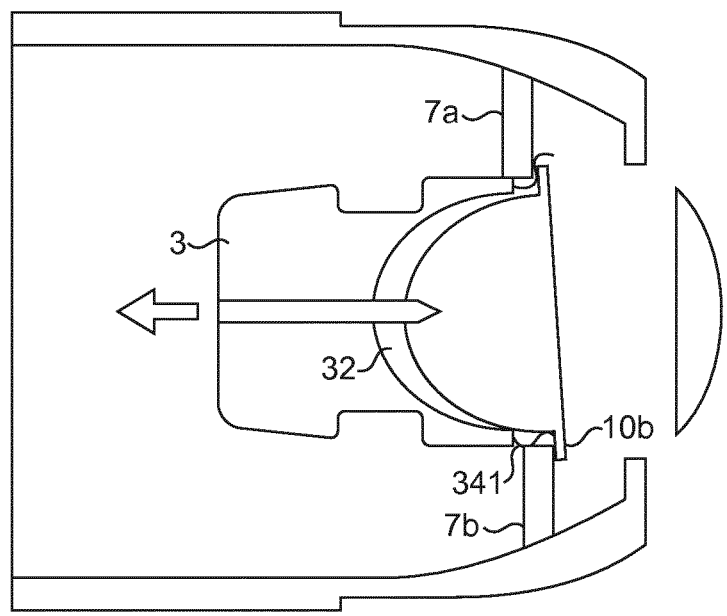

In FIG. 8e, while the first engagement member 3 moves back (as illustrated by the arrow), one lateral part of the rim of the capsule is retained by a first tab 7b which induces the lateral detachment of the capsule from the capsule receptacle 32, in particular the rim 10b is detached from the hook 341. On the other lateral side, the other hook 342 still retains the rim. Due to the schematic illustration, it may not be directly apparent that the hook 341 is not positioned in the same horizontal plane as the first tab 7b and accordingly does not interact with said tab. Actually, as illustrated in FIG. 7c, during the movement of the first engagement member, the hook 34 moves under the tab 7.

Figure 8F:
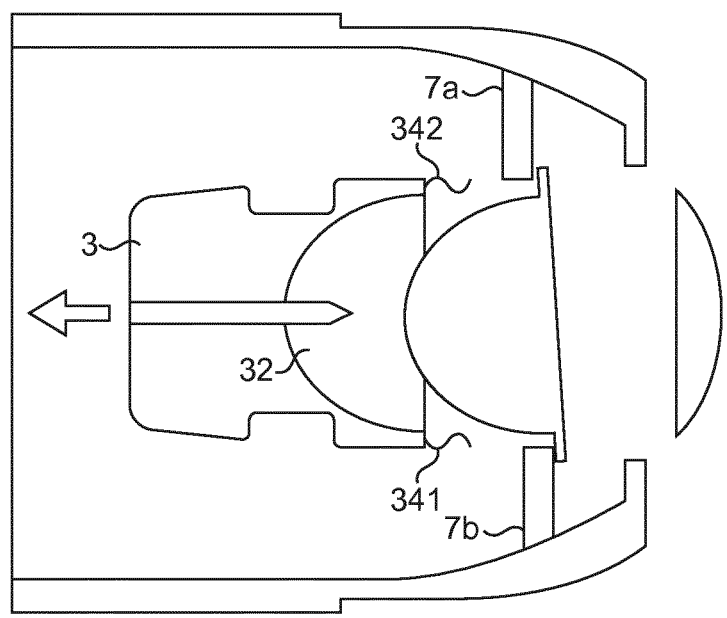

In FIG. 8f, while the first engagement member 3 goes on moving back (as illustrated by the arrow), another lateral part of the rim of the capsule is retained by a second tab 7a which induces the full detachment of the capsule from the hollow member 32, the rim 10b being detached from the second hook 342. The first engagement member 3 is able to finish its movement to its initial position, while the capsule is able to fall by gravity under the module.

The force for detaching the capsule 10 from the hollow member 32 in a two close steps is inferior to the force for detaching the capsule from the hollow member in only one step—that is when the tabs 7a, 7b are positioned symmetrically apart the axis XX'— and the risk that the capsule is energically detached and throw out horizontally in direction of the front end 2d—blocking the introduction of a new capsule—in place of falling vertically under the module is prevented.

Figure 9:
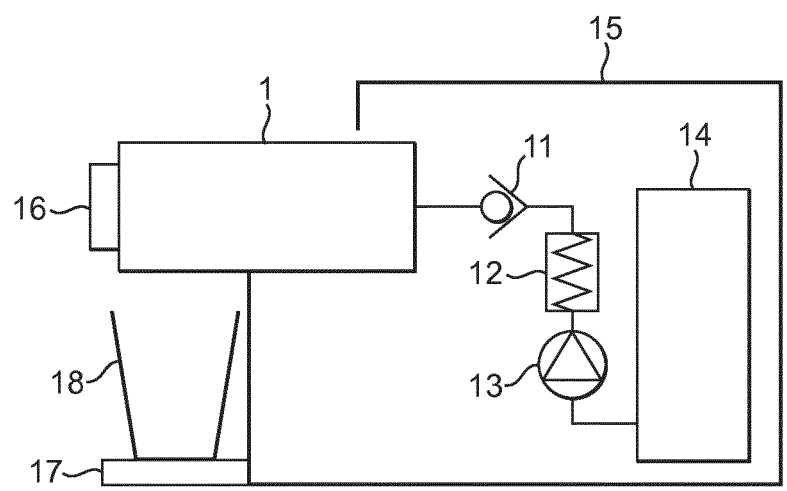
FIG. 9 illustrates a beverage preparation machine comprising the beverage production system of the invention.

FIG. 9 illustrates a beverage preparation machine comprising the beverage production system of the invention. The machine comprises a module 1, such as illustrated in FIGS. 1, 2, 3 and 7a to 7e. The hollow needle 31 is connected to a fluid supply comprising successively a check valve, a heater, a pump and a fluid supply, usually a water tank. The different elements of the machine can be surrounded by a frame 15. The machine can comprise a drip tray 18 for supporting and positioning a cup 19 under the module 1. A user interface 16 can be provided to control the beverage preparation.

Although the invention has been described with reference to the above illustrated embodiments, it will be appreciated that the invention as claimed is not limited in any way by these illustrated embodiments.

Variations and modifications may be made without departing from the scope of the invention as defined in the claims. Furthermore, where known equivalents exist to specific features, such equivalents are incorporated as if specifically referred in this specification.

As used in this specification, the words "comprises", "comprising", and similar words, are not to be interpreted in an exclusive or exhaustive sense. In other words, they are intended to mean "including, but not limited to".

LIST OF REFERENCES IN THE DRAWINGS module 1
frame 2
lateral walls 2a, 2b rear end 2c
front end 2d
upper opening 21
handle 41
rear end 41a
axis 42
lateral wall 43a, 43b
guiding curve 431a, 431b
guiding curve 23a, 23b
linear segment 231, 232
first capsule engagement member 3
hollow needle 31
guiding pin 31a, 31b
capsule receptacle 32
  front side 321
    lateral side 3211, 3212
hook 34, 341, 342
  arm 34a
  slanted end 34b
  slit 34c
pre-fixation members 5, 5a, 5b
identification member 6
tab 7, 7a, 7b
support means 71, 71'
capsule 10
capsule enclosure 10a
capsule rim 10b
check valve 11
heater 12
pump 13
tank 14
housing 15
user interface 16
drip tray 17
cup 18

The invention claimed is:

1. A beverage production system comprising a capsule and a module for producing a beverage from the capsule, the capsule comprising an enclosure and a rim, and the module comprising:
a first capsule engagement member, which can be displaced relative to a second, co-operating capsule engagement member between a capsule discharge position and a beverage production position,
a retractor for actively retracting the first capsule engagement member from the beverage production position to the capsule discharge position in which the capsule is discharged from the first capsule engagement member,
the displaceable first capsule engagement member comprising a capsule receptacle, and
the capsule presenting:
an enclosure outer shape that is conformal to at least a portion of the capsule receptacle, and
a rim size such that at least a part of the rim of the capsule extends beyond at least a part of the first capsule engagement member once it is engaged in the first capsule engagement member, and
the displaceable first capsule engagement member comprising a holder configured for holding the capsule within the capsule receptacle,
the module comprising at least two retainers for retaining the rim of the capsule extending beyond the first capsule engagement member when the first capsule engagement member is displaced from the beverage production position to its capsule discharge position, wherein the holder comprises discrete hooks configured to engage with the rim of the capsule, and
wherein the two retainers are configured so that, during the displacement of the first capsule engagement member from the beverage production position to its capsule discharge position, one of the two retainers engages the rim of the capsule before the other retainer.

2. A beverage production system according to claim 1, wherein:
one retainer is positioned on each lateral side of the longitudinal axis of displacement of the first capsule engagement member, and
the positions of the two retainers along the longitudinal axis of displacement are offset one relative to the other.

3. A beverage production system according to claim 2, wherein the positions of the two retainers along the longitudinal axis of the frame of the module are offset one relative to the other by at least 1 mm.

4. A beverage production system according to any one of the claim 1, wherein:
the module comprises lateral walls on each lateral side of the path of the first capsule engagement member, and
the at least two retainers are tabs protruding from the lateral walls.

5. A beverage production system according to claim 1, wherein the displaceable first capsule engagement member comprises two hooks configured to engage with the rim of the capsule, the hooks being positioned on the lateral sides of the front face of the capsule receptacle.

6. A beverage production system according to claim 1, wherein the hooks and the first capsule engagement member are made of the same plastic material and are molded as one single piece with that member.

7. A beverage production system according to claim 1, wherein each hook comprises an arm extending from a lateral side of the front face of the capsule receptacle, the arm presenting a slanted end and comprising a vertical slit.

8. A beverage production system according to claim 1, wherein tabs are positioned in the lateral walls of the module so as to engage a part of the rim of the capsule, the part being close to the portion of the rim engaged with one of the hooks.

9. A beverage production system according to claim 1 wherein the retractor is designed to implement the combination of a horizontal linear movement and an upwardly swivelling end movement.

10. A beverage production system according to claim 1 wherein the first capsule engagement member comprises an opener for piercing the capsule and injecting water in the capsule.

11. A beverage production system according to claim 1 wherein the module comprises an opener for piercing the capsule and producing a beverage outlet in the capsule.

12. A beverage production system according to claim 1 wherein the module comprises pre-fixation members which are designed to engage with the rim of the capsule for fixation of the capsule close to the second engagement member.

13. A method for producing a beverage from a capsule comprising an enclosure and a rim in a beverage production system comprising a capsule and a module for producing a beverage from the capsule, the capsule comprising an enclosure and a rim, and the module comprising: a first capsule engagement member, which can be displaced relative to a second, co-operating capsule engagement member between a capsule discharge position and a beverage production position, a retractor for actively retracting the first capsule engagement member from the beverage production position to the capsule discharge position in which the capsule is discharged from the first capsule engagement member, the displaceable first capsule engagement member comprising a capsule receptacle, and the capsule presenting: an enclosure outer shape that is conformal to at least a portion of the capsule receptacle, and a rim size such that at least a part of the rim of the capsule extends beyond at least a part of the first capsule engagement member once it is engaged in the first capsule engagement member, and the displaceable first capsule engagement member comprising a holder configured for holding the capsule within the capsule receptacle, the module comprising at least two retainers for retaining the rim of the capsule extending beyond the first capsule engagement member when the first capsule engagement member is displaced from the beverage production position to its capsule discharge position, wherein the holder comprises discrete hooks configured to engage with the rim of the capsule, and wherein the two retainers are configured so that, during the displacement of the first capsule engagement member from the beverage production position to its capsule discharge position, one of the two retainers engages the rim of the capsule before the other retainer, wherein:

the hooks engage with the rim of the capsule, when the first capsule engagement member is displaced to the second, co-operating capsule engagement member, and the two retainers of the module retain the rim of the capsule successively one after the other during the displacement of the first capsule engagement member from the beverage production position to its capsule discharge position.

\* \* \* \* \*